G. G. BATES.
Packing or Show-Cases.
No. 142,073.                      Patented August 26, 1873.
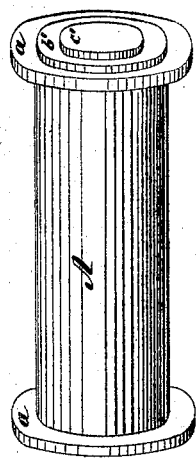
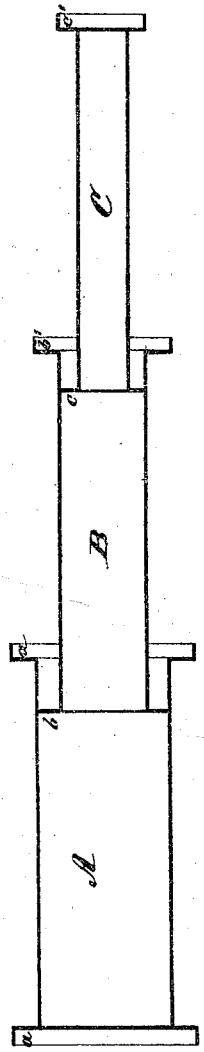
Witnesses.
C. Thornton
J. E. Jones
Inventor
George G. Bates
p. Henry E. Roeder
Attorney

UNITED STATES PATENT OFFICE.

GEORGE G. BATES, OF NEW YORK, N. Y.

IMPROVEMENT IN PACKING OR SHOW CASES.

Specification forming part of Letters Patent No. 142,073, dated August 26, 1873; application filed June 9, 1873.

*To all whom it may concern:*

Be it known that I, GEORGE G. BATES, of New York, in the State of New York, have invented a new and Improved Packing or Show Case, of which the following is a specification:

The nature of my invention consists in the arrangement of two, three, or more boxes, open on one end, and placed inside each other, leaving sufficient space for the articles, such as frill, fringe, or similar trimmings, to be wound around the outer surface of each box, said boxes sliding inside each other similar to a telescope.

In the accompanying drawing, Figure I represents a perspective view of a packing-box when closed together and embodying my invention. Fig. II is a longitudinal section of the same when drawn out.

The boxes, as here represented, are made round; but the same may be made oval, square, or polygonal, as may be desired, and whatever shape suits best the class of goods for which the same are intended.

A B C are three boxes, open on one end, and provided with flanges $a\ b\ b'\ c\ c'$, respectively, at each end. The flanges $b$ and $c$ are of such a diameter as to fit into the respective boxes A and B, while the flanges $b'$ and $c'$ are somewhat larger than the inside diameters of the boxes A and B, to act as a stop when the boxes are closed together, while the flanges $b$ and $c$ act as guides for their respective cylinders in the other cylinder or box, when the same are pulled out or pushed in. The amount of projection of the flanges $a$, $b$, and $c$, above the body of their boxes A, B, and C, depends upon the nature of the articles to be wound around the same.

The article or articles are wound around the body of the boxes A, B, and C, not exceeding in depth the outside diameter of their respective flanges $a$, $b$, and $c$.

When the trimmings or other manufactured articles wound around the boxes are to be exhibited for examination or show in the show room or window, the boxes are pulled apart similar to a telescope, as represented in Fig. II, exhibiting thereby a very large and extended surface of the goods for examination or show, while, when the boxes are to be shipped or packed for transportation, the boxes are pushed together, as represented in Fig. I, and will then occupy a comparatively small space.

What I claim as my invention, and desire to secure by Letters Patent, is—

The combination of two, three, or more boxes, A B C, provided with projecting flanges on each end, and operating similar to a telescope, substantially as and for the purpose hereinbefore set forth.

GEORGE G. BATES.

Witnesses:
HENRY E. ROEDER,
C. THORNTON.